June 15, 1954  M. E. ROUSEY  2,680,946
MOWER ATTACHMENT FOR TRACTORS
Filed Nov. 28, 1950  2 Sheets-Sheet 1
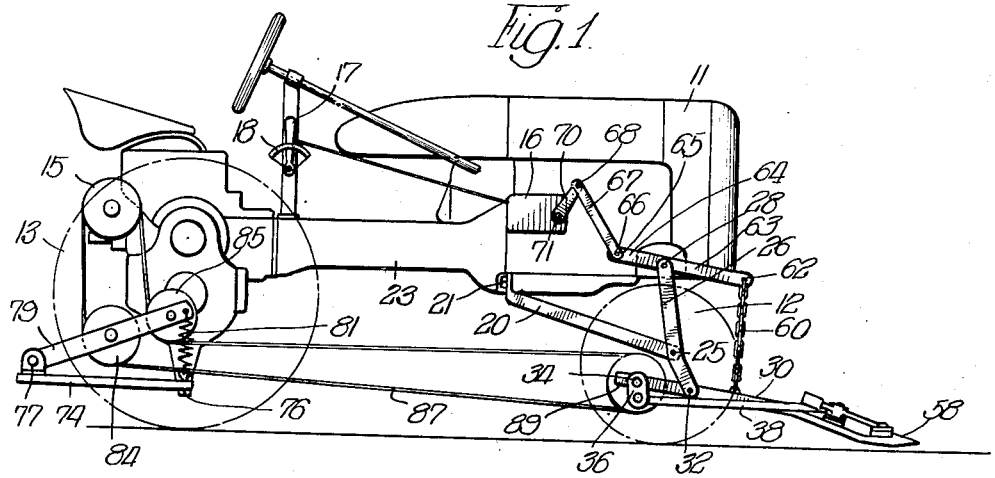
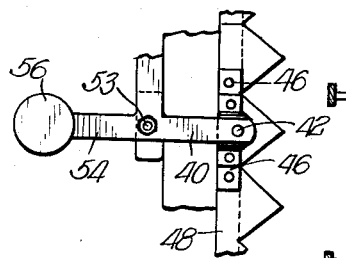
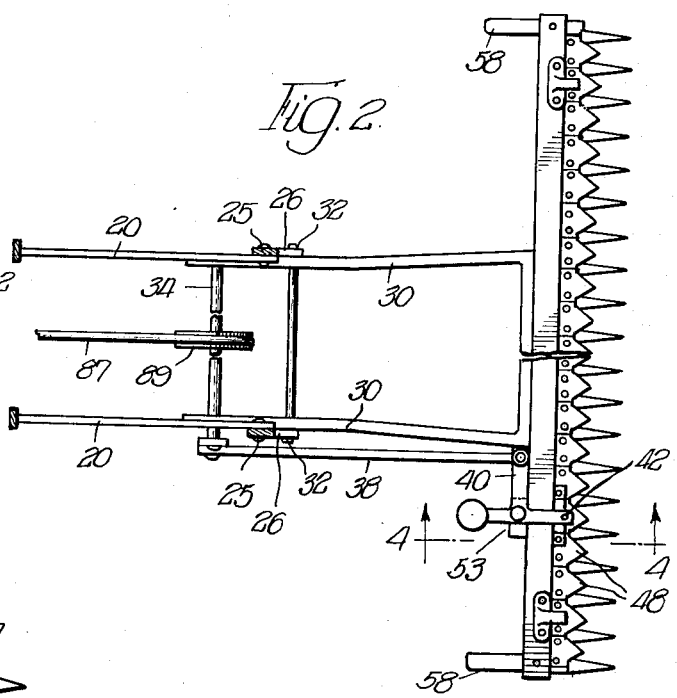
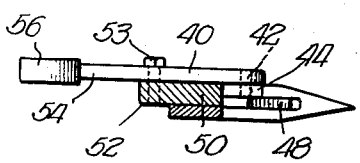
INVENTOR.
Merlin E. Rousey,
BY

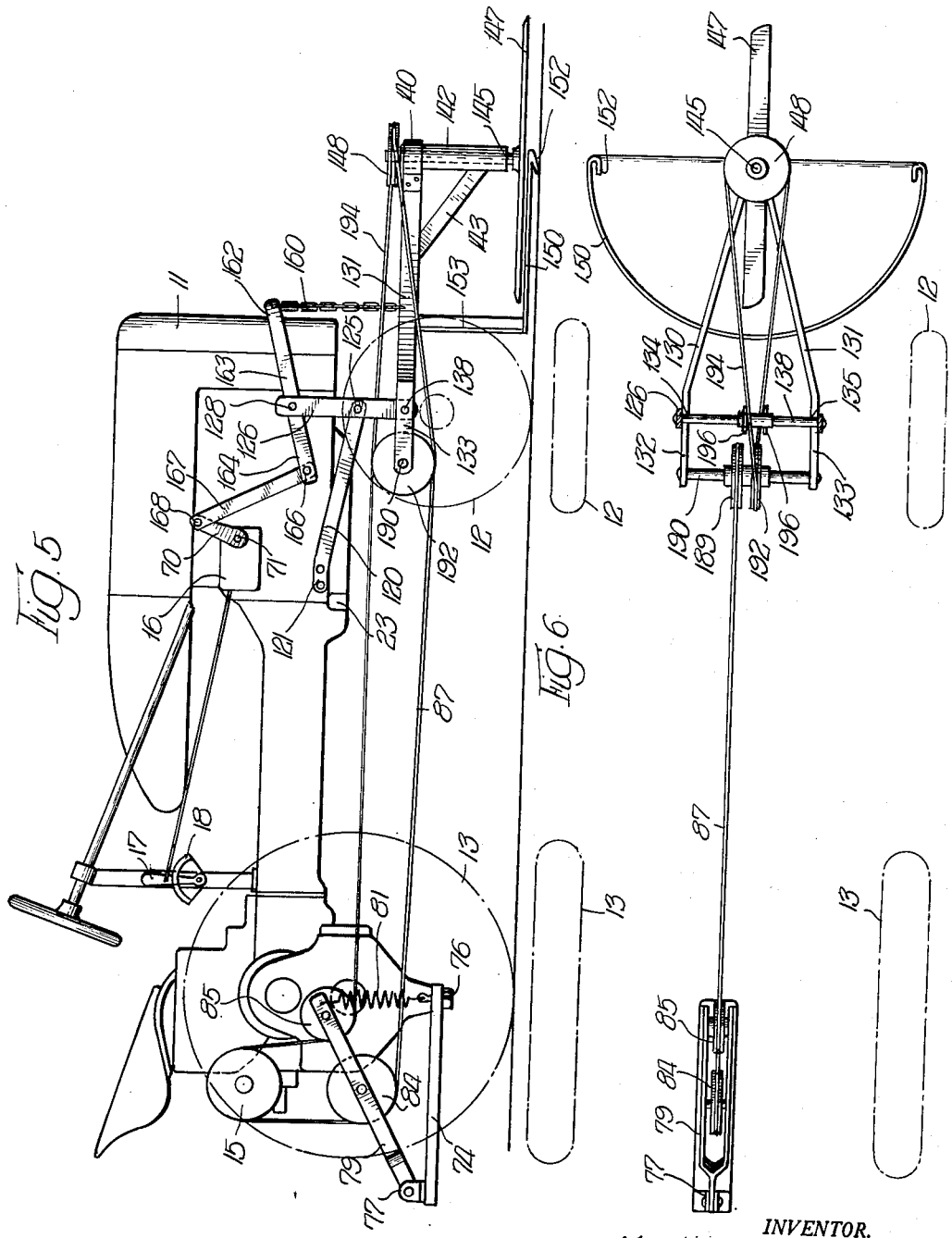

Patented June 15, 1954

2,680,946

UNITED STATES PATENT OFFICE 2,680,946

MOWER ATTACHMENT FOR TRACTORS

Merlin E. Rousey, McLean, Ill.

Application November 28, 1950, Serial No. 197,992

2 Claims. (Cl. 56—25.4)

This invention relates to a new and improved mower attachment for power tractors. More particularly it relates to an attachment by which a mower is carried ahead of a tractor and both moved and operated by power supplied by the tractor.

Usual tractor operated mowers are towed behind the tractor, the tractor merely supplying the motive power. A mower which is carried ahead of the tractor and positively controlled in direction by the tractor has numerous advantages over a towed mower. The mower carried on the front of a tractor may be more effectively used in mowing a lawn or yard as it can be worked closely around trees and in corners. Such a mower is advantageous for all mowing purposes because of the fact that the growth being cut is not rolled or pressed down by the tractor tires and may thus be evenly cut without loss.

A mower attachment of this character should be readily attached to a tractor and removed therefrom as the tractor will normally be used for other purposes a majority of the time. Such a mower is also desirable, however, for the reason that, since it extends in front of the tractor, it does not interfere with other use of the tractor for towing purposes while the mower is mounted on the tractor and lifted out of operative position.

It is an object of the present invention to provide a new and improved mower attachment for tractors.

It is also an object to provide such an attachment which is carried in front of the tractor and may be raised or lowered between operative and inoperative positions.

It is an additional object to provide a mower attachment adapted to be operated from the power take-off means of a tractor by means of a belt and pulleys.

It is another object to provide a mower attachment which may be easily attached to or removed from a tractor.

It is a further object to provide a mower which is simple in design, construction and operation and adapted for commercial production and use.

Other and further objects will appear as the description proceeds.

I have shown certain preferred embodiments of my invention in the accompanying drawings in which—

Figure 1 is an elevational view of a tractor with the mower attachment applied thereto;

Figure 2 is an enlarged plan view with parts broken away and shown in section of the mower frame, mower, and its main drive assembly;

Figure 3 is an enlarged fragmentary plan view on an enlarged scale of the cutter bars drive connections;

Figure 4 is a fragmentary section on an enlarged scale taken on line 4—4 of Figure 2;

Figure 5 is an enlarged elevational view, similar to Figure 1, showing a modified form of construction; and Figure 6 is a plan view with parts broken away and shown in section of the mower frame, mower and drive of Figure 5.

Referring first to the construction shown in Figures 1 to 4, the tractor generally indicated at 11 is provided with the usual front wheels 12 and rear wheels indicated at 13. The tractor is also supplied with a rear power take-off which drives the pulley 15. The tractor is shown as provided with a hydraulically operated power lift 16 controlled by lever 17 operating on quadrant 19. It will be understood that the tractor construction so far described may be of any commercial form and in itself forms no part of the present invention.

The support frame for the attachment comprises diagonal brace bars 20 at each side of the tractor, the rear ends of which bars 20 are secured at 21 to the tractor frame 23. The front ends of the brace bars 20 are connected at 25 to the downwardly extending frame bars 26. The upper ends of frame bars 26 are connected by bolts 28 to the tractor frame 23 or to any convenient portion of the tractor. The main mower frame 30 comprises two similar members, as best shown in Figure 2. These members are pivotally supported at 32 on the supporting frame bars 26. The rear ends of the main frame members 30 carry the rotating cross shaft 34, the right end of this shaft 34 being provided with a crank arm 36. This crank arm 36 is connected by pitman 38 with a bell crank lever 40 which operates the cutter bar. The forward end of the bell crank lever 40 is pivotally connected by pin 42 with a block 44, this block fitting between fixed blocks 46 which are secured to the cutter bar 48. The cutter bar frame 50 has a rearwardly extending lug 52 on which the bell crank lever 40 is pivoted at 53. The bell crank lever 40 is provided with a rear extension 54 having a counter-balance weight 56 at its outer end. The cutter frame 50 is provided with runners or slides 58 which normally ride on the ground when the mower is in operation.

The mower frame members 30 are each connected by a lifting chain 60 to the front end 62 of a lifting arm 63, which arm is pivoted on a bushing fitted on bolt 28 which secures the upper end of supporting frame bar 26 to the tractor frame. The rear end 64 of lifting arm 63 has a pivoted connection at 65 by means of a pin 66 to the end of the link 67. The other end of link 67 has a pivoted connection at 68 to the arm 70 which arm is fixedly secured to the rotatable cross shaft 71 of the power lift 16.

The draw bar 74 serves as a pulley arm support member and is connected to the tractor at 76 and has its rear portion provided with a fixed pivot member 77. The pulley arm 79 is pivoted on pivot member 77 and the free end of the pulley arm 79 is connected by downwardly extending spring 81 to an adjacent portion of the tractor frame. The pulley arm 79 carries a pair of idler pulleys 84 and 85. The continuous drive belt 87 extends around the power take-off pulley 15 and under the idler pulleys 84 and 85, as shown in Figure 1. The forward end of this belt 87 extends around the mower drive pulley 89 carried on the shaft 34.

The form of construction shown in Figures 5 and 6 is generally similar to that shown in Figures 1 to 4, but is applied to a mower having a rotating cutter rather than a reciprocating cutter. The tractor 11 shown in Figure 5 is the same as that shown in Figure 1. It is provided with wheels 12 and 13, the rear power take-off pulley 15, and the hydraulically operated power lift controlled by lever 17 operating on quadrant 18.

The support frame for the mower attachment comprises diagonal brace bars 120 at each side of the tractor, the rear ends of the bars 120 being secured at 121 to the tractor frame 23. The front ends of the brace bars 120 are connected at 125 to the downwardly extending frame bars 126. The upper ends of frame bars 126 are connected by bolts 128 to the tractor frame 23 or to any convenient portion of the tractor.

The main mower frame comprises a pair of similar but reversely bent members 130 and 131 having parallel rear portions 132 and 133, respectively, which are pivotally supported at 134 and 135 on cross shaft 138 carried by the lower ends of the frame bars 126. The forward ends of members 130 and 131 are joined by yoke 140 which carries the vertical bearing member 142. The lower portion of bearing member 142 is connected by braces 143 to the members 130 and 131.

The cutter shaft 145 is carried by bearing member 142 with the cutter blade 147 at its lower end and the pulley 148 at its upper end. The arcuate cutter guard 150 has the down turned ends 152 which are adapted to engage the ground surface and act as skids to maintain the cutter 147 above the surface at all times. The guard 150 is supported from frame members 130 and 131 by members 153.

The frame member 131 is connected by lifting chain 160 to the front end 162 of a lifting arm 163, which arm is pivoted on bolt 128 which secures the upper end of supporting frame bar 126 to the tractor frame. The rear end 164 of the lifting arm 163 is pivotally connected by pin 166 to the lower end of link 167. The upper end of link 167 has a pivoted connection at 168 to the arm 70 which is fixedly secured to the rotatable cross shaft 71 of the power lift 16.

The power take-off connections of Figure 5 are similar to those of Figure 1, the belt 87 driving the pulley 189 on the rotatable cross shaft 190 carried by the rear parallel portions 132 and 133 of the frame members 130 and 131. This shaft 190 also carries the pulley 192 which drives belt 194 passing around pulley 148 on the cutter shaft 145. Belt guides 196 are shown as carried by shaft 138 to retain belt 194 in place on pulleys 148 and 192.

In the operation of the first form of construction of the mower with the parts in a position shown in Figure 1, the cross shaft 34 will be rotated by means of belt 87 which belt is driven from the power take-off pulley 15. The tension of spring 81 serves to pull down the idler pulleys 84 and 85 and keep the belt 87 in firm driving contact with pulley 89 on shaft 34. The crank arm 36 reciprocates the pitman 38. This pitman rocks the bell crank lever 40 about its pivot 53. This movement of the bell crank 40 causes the block 44 to move to the right and left. This block 44 thrusts alternately against the two blocks 46 fixed to the cutter blade. The cutter blade is thus given a reciprocative movement for its cutting action.

The operation of the form of construction shown in Figures 5 and 6 is similar, the cutter 147 being rotated with shaft 145 by means of belt 194 driving pulley 148.

When it is desired to put the mower of Figure 1 out of action or to lift it for any reason, the hydraulic power lift 16 is operated by means of lever 17, the arms 70 swinging in the clockwise direction to force link 67 downwardly which thrusts the rear end 64 of the arm 63 downwardly. By means of chain 60 connected to the forward end of arm 63 to a frame member 30, these two frame members 30 are swung upwardly or in the counter-clockwise direction about their pivots 32. This lifts the cutter bar from the ground. During this lifting movement the rear of the frame members 30 will be moved downwardly carrying downwardly the shaft 34 and pulley 89. Due to the location of the parts and of the pivot 32 relative to shaft 34, the distance between pulley 89 and the idler pulleys 84 and 85 will not be greatly increased. The belt 87 will lift the idler pulleys 84 and 85 somewhat against the resistance of spring 81 during this movement, but the spring retains the belt in close contact with the pulleys throughout the range of movement.

The mower of Figures 5 and 6 is lifted in the same manner, the chain 160 swinging the entire cutter and drive assembly about the shaft 138 as a pivot.

It will be apparent that the constructions shown are simple in design and that due to the geometry of the parts and the spring control of the belt drive, either type of mower may ride over rough ground while maintaining full drive of the cutter blade. The cutter assembly may be lifted completely clear of the ground without disconnection of any drive parts. The entire mower assembly shown in Figure 1 may be readily removed from the tractor when desired by merely removing the bolts 28 and 21 which connect the frame members 20 and 26 to the tractor frame and also disconnecting the link 67 from the arm 70. The construction of Figures 5 and 6 may be removed in a similar manner. The idler pulleys 84 and 85 may be similarly removed by disconnection from draw bar 74 when desired.

While the lifting action of the cutter member has been described as for the purpose of rendering it inoperative, it will be understood that the cutter may be operated in a raised position if it is desired to cut at a distance above the ground greater than that at which the runners 58 or 152 hold the cutter. In normal operation the runners 58 or 152 rest on the ground and the chains 60 or 160 are slack so that the runners may follow rough ground.

It will be understood that the general relation of the frame and lifting members may be modified to fit different types of tractors. Also the mower may be lifted manually where hydraulic or other power for lifting is not available.

The specific embodiments shown are illustrative only and I contemplate such modifications as come within the spirit and scope of the appended claims.

What is claimed is:

1. A mower attachment for a motor vehicle having a power take-off drive, said mower attachment comprising a support frame adapted to be fixedly attached to the vehicle and having members extending downwardly from the vehicle between the wheels of the vehicle, a tiltable mower frame supported at an intermediate pivot point on the downwardly extending members below the vehicle frame, said mower frame having a forwardly extending portion carrying a mower having a rotatable cutter member on a shaft operating about a vertical axis, a transverse rotatable shaft carried by the mower frame in the rear of its line of pivotal support, a plurality of pulleys fixedly secured to the rotatable shaft, a drive belt connecting one of the pulleys and the cutter member shaft, a second belt drive between another pulley and the power take-off, a lifting arm pivotally supported on the support frame and extending forwardly thereof and a connection between the forwardly extending portion of the arm and the mower frame whereby the mower frame may be raised and lowered.

2. A mower attachment for a motor vehicle having a power take-off drive, said mower attachment comprising a support frame adapted to be fixedly attached to the vehicle and having members extending downwardly from the vehicle between the wheels of the vehicle, a tiltable mower frame supported at an intermediate pivot point on the downwardly extending members below the vehicle frame, said mower frame having a forwardly extending portion carrying a bearing member supporting a vertically extending cutter shaft, the cutter shaft having a radially extending cutter blade at its lower end and a pulley at its upper end, an arcuate cutter guard carried by the tiltable mower frame in the rear of the cutter blade, said cutter guard having ground engaging portions located laterally of the blade, a lifting arm having an intermediate pivot on the support frame and having a portion extending above the forward portion of the mower frame and connected thereto by lifting means, means for raising and lowering the rear end of the lifting arm to lower and raise the cutter blade, pulleys on a rotatable shaft carried by the mower frame in the rear of its pivot, a drive belt connecting one of said pulleys and the pulley on the cutter shaft, and a drive belt connecting another pulley on the rotatable shaft to the vehicle power take-off.

References Cited in the file of this patent

UNITED STATES PATENTS

| Number | Name | Date |
|---|---|---|
| 957,660 | Delano | May 10, 1910 |
| 1,372,339 | Cook | Mar. 22, 1921 |
| 1,657,994 | Dayton | Jan. 31, 1928 |
| 1,690,950 | Salas | Nov. 6, 1928 |
| 2,190,161 | Moyer | Feb. 13, 1940 |
| 2,340,488 | Paradise et al. | Feb. 1, 1944 |
| 2,483,683 | Wells et al. | Oct. 4, 1949 |
| 2,501,424 | Ufer | Mar. 21, 1950 |